(12) United States Patent
Kihira

(10) Patent No.: US 8,879,842 B2
(45) Date of Patent: Nov. 4, 2014

(54) METHOD AND NON-TRANSITORY COMPUTER READABLE MEDIUM FOR HTML FILE CONVERSION

(75) Inventor: Takuo Kihira, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 117 days.

(21) Appl. No.: 13/554,354

(22) Filed: Jul. 20, 2012

(65) Prior Publication Data

US 2013/0028514 A1 Jan. 31, 2013

(30) Foreign Application Priority Data

Jul. 28, 2011 (JP) .................................. 2011-165918

(51) Int. Cl.
*G06K 9/00* (2006.01)
*G06F 17/30* (2006.01)

(52) U.S. Cl.
CPC .............................. *G06F 17/30896* (2013.01)
USPC ............................ 382/167; 382/162; 382/274

(58) Field of Classification Search
USPC ........... 382/162, 176, 167, 274; 358/1.9, 518; 709/223, 231, 233
See application file for complete search history.

(56) References Cited

U.S. PATENT DOCUMENTS 7,218,414 B2 * 5/2007 Nakao .............................. 358/1.9
7,260,641 B2 * 8/2007 Decker et al. .................. 709/233

* cited by examiner

*Primary Examiner* — Anh Do
(74) *Attorney, Agent, or Firm* — Rothwell, Figg, Ernst & Manbeck, P.C.

(57) ABSTRACT

An HTML file for making a browser adapted to a canvas element in HTML5 perform a process of color conversion of a specified image with specified characteristics and display the converted image at high speed. In the process of carrying out color conversion of the specified image with specified characteristics and displaying the converted image, an algorithm is employed such that data manipulation on a pixel-by-pixel basis is not instructed from the HTML file to the browser, but instead a plurality of instructions are given to overwrite an entire area of a bitmap image as original image data, and data derived therefrom are expanded onto a canvas uniformly with color of an appropriate brightness value and transparency.

3 Claims, 3 Drawing Sheets

```
1   <!DOCTYPE html>
2   <html><head><title>sample</title><script>
3   window.onload = function() {
4           // Input includes following two parameters and image file, e.g., "test.png"
5           var mulTerm = {R: 50, G: 75, B: 200};
6           var addTerm = {R: 127, G: 56, B: -100};
7
8           // Constant
9           var colors = ["R", "G", "B"];
10          var fillColor = {R: "rgb(255,0,0)", G: "rgb(0,255,0)", B: "rgb(0,0,255)"};
11
12          var img = document.createElement("img");
13          img.onload = function() {
14                  // For output
15                  var canvas = document.createElement("canvas");
16                  document.body.appendChild(canvas);
17                  canvas.width = img.width;
18                  canvas.height = img.height;
19
20                  var colorCanvas = {};
21                  for(var key in colors) {
22                          var color = colors[key];
23                          // Operations below repeated for R, G, B respectively.
24
25                          // Preparing memory area
26                          var c = document.createElement("canvas");
27                          colorCanvas[color] = c;
28                          c.width = img.width;
29                          c.height = img.height;
30                          var ctx = c.getContext("2d");
31
32                          // Extracting RGB components
33                          ctx.drawImage(img, 0, 0);
34                          ctx.globalCompositeOperation = "darker";
35                          ctx.fillStyle = fillColor[color];
36                          ctx.fillRect(0, 0, canvas.width, canvas.height);
```

FIG. 1A

```
37
38                              // Processing mulTerm
39                              ctx.globalCompositeOperation = "source-over"; // Standard mode
40                              ctx.globalAlpha = 1 - mulTerm[color] / 255;
41                              ctx.fillStyle = "rgb(0,0,0)";
42                              ctx.fillRect(0, 0, canvas.width, canvas.height);
43
44                              // Processing addTerm
45                              var add = addTerm[color];
46                              if(add >= 0) {
47                                      ctx.globalCompositeOperation = "lighter";
48                                      ctx.fillStyle = fillColor[color];
49                              } else {
50                                      ctx.globalCompositeOperation = "darker";
51                                      ctx.fillStyle = "rgb(0,0,0)";
52                                      add = -add;
53                              }
54                              ctx.globalAlpha = add / 255;
55                              ctx.fillRect(0, 0, canvas.width, canvas.height);
56                      }
57                      // Synthesizing RGB
58                      var ctx = canvas.getContext("2d");
59                      ctx.globalCompositeOperation = "lighter";
60                      ctx.drawImage(colorCanvas["R"], 0, 0);
61                      ctx.drawImage(colorCanvas["G"], 0, 0);
62                      ctx.drawImage(colorCanvas["B"], 0, 0);
63              };
64              img.src = "test.png";
65      };
66 </script></head><body></body></html>
```

METHOD AND NON-TRANSITORY COMPUTER READABLE MEDIUM FOR HTML FILE CONVERSION

CROSS-REFERENCE TO RELATED APPLICATION

The present application claims priority from Japanese Patent Application No. 2011-165918 filed on Jul. 28, 2011, the entire contents of which incorporated herein by reference.

BACKGROUND OF THE INVENTION

1. Technical Field

The present invention relates to an image manipulating method using HTML5, the latest version of a home page description language HTML serving as a basis of web applications. More particularly, the present invention relates to a HTML file that causes a browser adapted to canvas elements in HTML perform a process of color conversion of a specified image with specified characteristics and display of the converted image. It is to be noted that, in this specification, the term "browser" is used not only to mean a program implementing a function of a browser but also to mean a computer on which a browser program is run.

A HTML file is interpreted by a browser to enable the browser to display a home page that an author of a HTML file intends to show. Therefore, a HTML file is considered a kind of computer program that is described using HTML language and which causes a browser to perform a process of displaying a specific home page. In this sense, a HTML file described according to the present invention is a computer program and, therefore, the present invention relates to a computer program.

Furthermore, a file conversion method and a file conversion program that automatically convert an Adobe Flash® format SWF file into a HTML file of the present invention are within the scope of the present invention.

2. Background Art

The assignee of the present application owns and operates a social networking service named "Mobage" (TM pending), through which the assignee provides a wide variety of game contents for mobile phones such as "Kaito Royale®." Many of the game contents are constructed with HTML or SWF files. Specifically, animation in games is created using SWF files. As is well known, in order to execute SWF files to reproduce images as an author intends with a browser on an information terminal, installation of a program for executing SWF files, such as Flash Player®, in the browser of that information terminal is required.

Some of the latest information terminals called smart phones or tablets that are now extremely popular as well as a part of the rest do not have a browser adapted to Flash Player®. Such browsers not adapted to Flash Player® cannot reproduce animation created using SWF files in game contents properly. On the other hand, many of the latest information terminals incompatible with Flash Player® are adapted to HTML5.

Here, one typical animation technique produced using SWF files and used in game contents will be described, assuming full color image data of a game character. The technique includes defining the image data as original image data and changing the colors of the original image data in various manners in response to a game situation where the game character of the original image data appears. In other words, the same original image data appears or is displayed in various game scenes while the colors of the data are changed appropriately.

In a SWF format, in order to facilitate use of the above technique, the characteristics of color conversion of original image data are indicated by two types of parameters, "MultTerm" and "AddTerm."

"MultTerm" is the parameter for reducing RGB brightness values of all the pixels in original image data at a specified ratio. The reduction rates for the R brightness value, the G brightness value, and the B brightness value are designated as RedMultTerm, GreenMultTerm, and BlueMultTerm, respectively, and can be specified independently of each other.

"AddTerm" is the parameter for adding to or subtracting from the RGB brightness values of all the pixels in the original image data a specified value. The value to be added to or subtracted from the R brightness value, the G brightness value, and the B brightness value are designated as RedAddTerm, GreenAddTerm, and BlueAddTerm, respectively, and can also be specified independently of each other.

When designation of the original image data and the values of the color conversion parameters "MultTerm" and "AddTerm" are described in a SWF file, a program that executes the SWF file interprets the descriptions, creates image data subject to the color conversion of the original image data according to the specified characteristics at high speed, and displays an image according to the converted image data.

The present invention originated as an attempt to provide the high-speed display of original image data according to color conversion achieved using a combination of a SWF file and Flash Player® in an environment combining a browser not adapted to Flash Player® but to HTML5 and a HTML file.

In summary, the above-mentioned color conversion process involves multiplying each of the RGB brightness values of all the pixels of the original image data by a constant value and adding or subtracting a different constant value to or from the product of the multiplication. In order to implement the above process, an experiment was conducted using a method including making a browser perform a process of obtaining each of the RGB brightness values of each pixel in the original image data pixel by pixel, carrying out the above calculation, and updating each pixel of the original image data according to the calculation result using the HTML5 API using a function of a program described by JavaScript in a HTML file.

The experiment was a failure. Since the number of pixels of image data to be processed is extremely large, it took a substantial amount of time to update data of all the pixels in the image data by instructing a browser to operate the pixels from the HTML file according to a function of pixel operation defined by of the HTML5 API. As a result, the time period from reading of the HTML file by the browser to display of the image after color conversion became impermissibly long.

SUMMARY OF THE INVENTION

In HTML5, the specifications of the canvas elements that enable a browser to draw an image in a bitmap format and/or to color the image were defined. Description of a program in a HTML file using the canvas elements enables reading specified image data onto a bitmap canvas, using the read image as a foundation, drawing a figure on the foundation and synthesizing the two in a specified mode, and creating a new image on the bitmap canvas and displaying the same.

According to the HTML file of the present invention, firstly, specified image data (original image data) are read onto a bitmap canvas. Then, instead of manipulating the pixels of the original image data as described above, the original image data are set as a foundation and the entire area of the original image data is uniformly colored with an appropriate color under an appropriate synthesis mode. The programming method as invented converts the colors of the original image data and displays the converted image by repeating the above processing multiple times. By describing the HTML file according to this programming method, the time needed for the browser to read the HTML file and display the color-converted image is drastically shortened.

One aspect of the present invention is a non-transitory computer-readable storage medium containing a computer software program described as a HTML file configured to make a browser adapted to a HTML in which canvas elements are usable perform color conversion of a specified image according to specified characteristics and display the color-converted specified image. The HTML file comprises Descriptions 1-5:

Description 1 creating three sets of identical original image data, each set of original image data being expanded into a bitmap image;

Description 2, in a darker synthesis mode, overwriting the original image data uniformly with high brightness R primary color data, overwriting the original image data uniformly with high brightness G primary color data, overwriting the original image data uniformly with high brightness B primary color data, and creating R original image data, G original image data, and B original image data obtained by color separation of the original image data into three primary colors R, G, and B;

Description 3 containing a brightness value and a transparency value for attenuating a R component, a brightness value and a transparency value for attenuating a G component, and a brightness value and a transparency value for attenuating a B component, each of the brightness value and the transparency value corresponding to a ratio of attenuating each of the brightness values of RGB components of the original image data;

Description 3, in a mode such as a standard drawing mode, creating a darkened R image data by overwriting the R original image data uniformly with black data of the brightness value and the transparency value for attenuating the R component, creating a darkened G image data by overwriting the G original image data uniformly with black data of the brightness value and the transparency value for attenuating the G component, and creating a darkened B image data by overwriting the B original image data uniformly with black data of the brightness value and the transparency value for attenuating the B component;

Description 4 containing R primary color data with a brightness value and a transparency value for addition to and subtraction from the R component, G primary color data with a brightness value and a transparency value for addition to and subtraction from the G component, and B primary color data with a brightness value and a transparency value for addition to and subtraction from the B component, each primary color data corresponding to a value added to or subtracted from each of the brightness values of the respective RGB components of the original image data;

Description 4, in a lighter synthesis mode for addition and in a darker synthesis mode for subtraction, creating a dark-shifted R image data by overwriting the darkened R original image data uniformly with R primary color data with the brightness value and the transparency value for addition and subtraction of the R component, creating a dark-shifted G image data by overwriting the darkened G original image data uniformly with G primary color data with the brightness value and the transparency value for addition and subtraction of the G component, and creating a dark-shifted B image data by overwriting the darkened B original image data uniformly with B primary color data with the brightness value and the transparency value for addition and subtraction of the B component; and Description 5 synthesizing the dark-shifted R image data, the dark-shifted G image data, and the dark-shifted B image data, and displaying image data after color conversion.

BRIEF DESCRIPTION OF THE DRAWINGS

FIG. 1A shows a first half of an example of a description of a program as a core of a HTML file according to the present invention; and FIG. 1B shows a second half of an example of a description of a program as a core of a HTML file according to the present invention.

DESCRIPTION OF EMBODIMENTS

Figure 2:
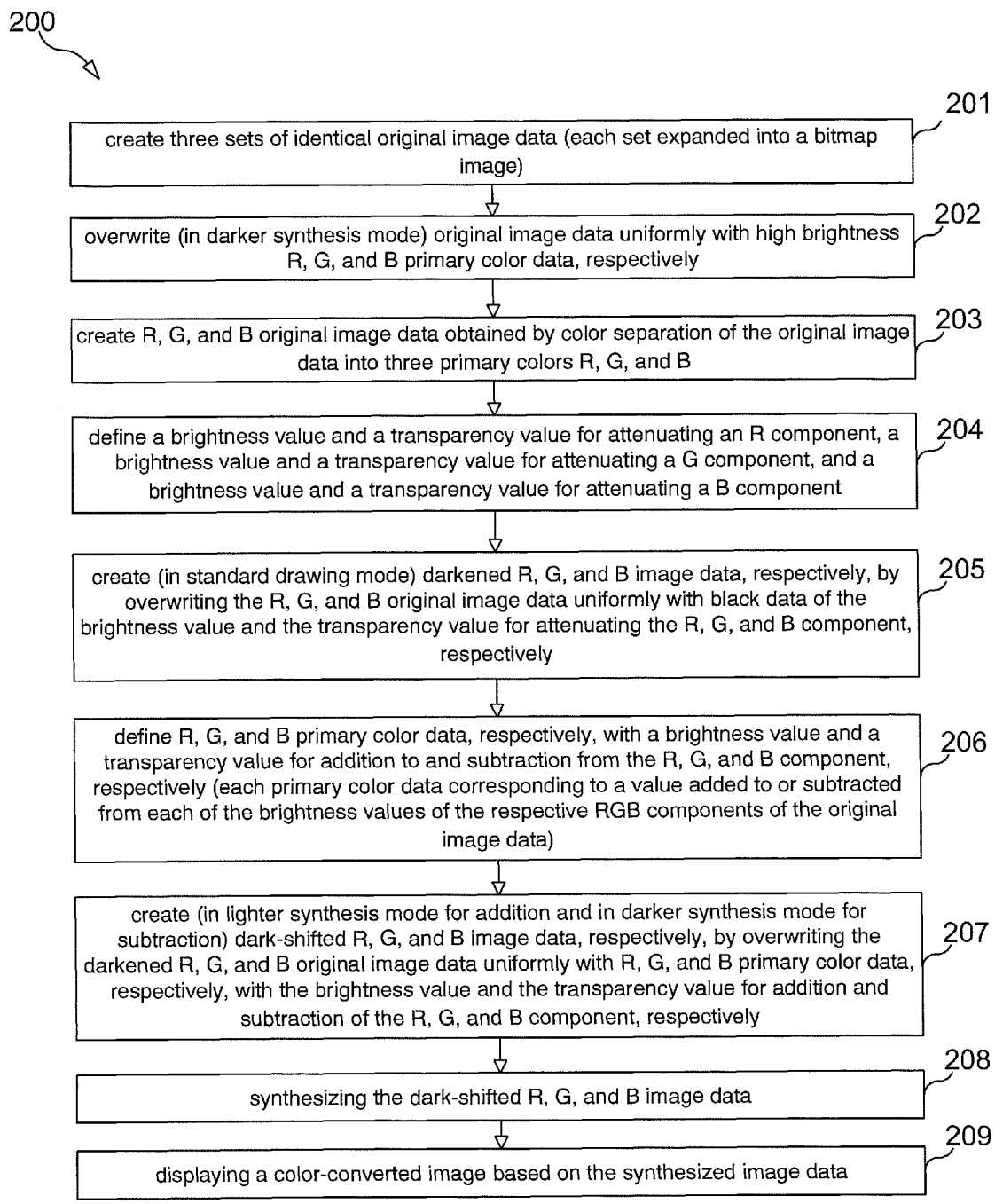
FIG. 2 shows a flow diagram of the steps of the present invention.

Conversion of a SWF File to a HTML File

Hereinbelow, an embodiment of the present invention will be described.

The embodiment is a conversion of an existing SWF file into a HTML file of the present invention according to a file conversion method, or a file conversion program, of the present invention. The SWF file to be converted is defined as document information including an original image as an object of color conversion processing and additional text information and the like. However, here, the description focuses only on the original image as an object of color conversion processing and a program logic for performing the color conversion processing on the original image using the converted HTML file and displaying the same. It is to be noted that although in the embodiment shown in FIGS. 1A and 1B JavaScript is employed as a programming language, any programming language may be used. The embodiment is also shown in diagram 200 of FIG. 2.

Original Image, MultTerm, and AddTerm

The image file name "test.png" specifying the original image as an object of color conversion extracted from a SWF file with the file conversion program is described on line number 64 in an embodiment of the HTML file as shown in FIGS. 1A and 1B. In the meantime, the multiplication parameter "MultTerm" and the addition/subtraction parameter "AddTerm" for defining characteristics of color conversion processing of the original image are extracted from the above SWF file and described on lines 5 and 6 in the HTML file.

HTML defines a maximum brightness value for the RGB pixels of 255 (204 of FIG. 2). Under this definition, the description, {R: 50, G: 75, B: 200} on line number 5 means performing multiplication using the parameters below on each of the pixel brightness values of the bitmap image file named "test.png":

(1) Multiplying the R brightness value by (50/255);
(2) Multiplying the G brightness value by (75/255); and
(3) Multiplying the B brightness value by (200/255).
(1) Multiplying the R brightness value by (50/255);
(2) Multiplying the G brightness value by (75/255); and
(3) Multiplying the B brightness value by (200/255).

The description, {R: 127, G: 56, B: −100} on line number 6 means performing addition or subtraction using the parameters below on each of the pixel brightness values after the above multiplication:

(1) Adding 127 to the R brightness value after the multiplication;

(2) Adding 56 to the G brightness value after the multiplication; and (3) Subtracting 100 from the B brightness value after the multiplication.

Described hereinbelow is a part of the HTML file created based on the information extracted from the original SWF file.

Color Separation of Original Image into Three Primary Colors

According to the HTML file of the embodiment, color conversion processing is prepared on lines 9-30 and the processing on lines 33-36 is performed three times while changing colors to separate the original image file named "test.png" into three primary colors and to create R original image data, G original image data, and B original image data on a prepared canvas (step 201 of FIG. 2).

According to the processing on line number 33, the original image data are expanded onto the canvas. The processing on line number 34 sets a drawing synthesis mode to a "darker" synthesis mode. In this condition, overwriting the original image data uniformly with high brightness R primary color data (255,0,0) overwriting the original image data uniformly with high brightness G primary color data (0,255,0), overwriting the original image data uniformly with high brightness B primary color data (0,0,255) create R original image data, G original image data, and B original image data, respectively. The above processing is performed on lines 35 and 36 and steps 202 and 203 of FIG. 2.

Multiplication

On lines 39-42 and step 205 of FIG. 2, a multiplication process is described. First, the process of multiplying the R brightness value by (50/255) (e.g. in step 204) will be described. The drawing synthesis mode is set to a standard mode. In this mode, overwriting the R original image data on the canvas uniformly with black data having a RGB brightness value of (0, 0, 0) of and a transparency (alpha value) of 1-(50/255) creates darkened R image data, in which brightness values of all the pixels of the R original image data are attenuated by a certain value.

Similarly, in the standard mode, overwriting the G original image data on the canvas uniformly with black data having a RGB brightness value of (0, 0, 0) and a transparency (alpha value) of 1-(75/255) creates darkened G image data, in which brightness values of all the pixels of the G original image data are attenuated by a certain value.

Similarly, in the standard mode, overwriting the B original image data on the canvas uniformly with black data having a RGB brightness value of (0, 0, 0) and a transparency (alpha value) of 1-(200/255) creates darkened B image data, in which brightness values of all the pixels of the B original image data are attenuated by a certain value.

Addition/Subtraction

Lines 45-55 and steps 206 and 207 of FIG. 2 describe addition/subtraction processing. In order that addition processing is performed in the case where the "AddTerm" values for R and G are positive, the drawing synthesis mode is set to a "lighter" synthesis mode. Here, a dark-shifted R image data is created by overwriting the darkened R original image data uniformly with R primary color data having a brightness value of (255, 0, 0) and a transparency value of (127/255) as an alpha value. The dark-shifted R image data is data in which the brightness values of all the pixels of the darkened R image data are increased by a certain value.

Similarly, in the "lighter" synthesis mode, a dark-shifted G image data is created by overwriting the darkened G original image data uniformly with G primary color data having a brightness value of (0, 255, 0) and a transparency value of (56/255) as an alpha value. The dark-shifted G image data is data in which the brightness values of all the pixels of the darkened G image data are increased by a certain value.

In order that subtraction processing is performed in the case where the "AddTerm" value for B is negative, the drawing synthesis mode is set to a "darker" synthesis mode. Then, a dark-shifted B image data is created by overwriting the darkened B original image data uniformly with black data having a brightness value of (0, 0, 0) and a transparency value of (100/255) as an alpha value. The dark-shifted B image data is data in which the brightness values of all the pixels of the darkened R image data are decreased by a certain value.

Synthesis of Images of Three Primary Colors

Lastly, according to the processing listed on lines 58-62 and step 208 of FIG. 2, the drawing synthesis mode is set to the "lighter" synthesis mode, overlaying the dark-shifted R image data, the dark-shifted G image data, and the dark-shifted B image data as created above on a canvas, thereby producing image data that is obtained by color conversion of the original image data file named "test.png" according to the multiplication parameter "MultTerm" and the addition/subtraction parameter "AddTerm", and the obtained image data is output for display (step 209 of FIG. 2).

EFFECTS OF THE INVENTION

As can be understood from the above description of the HTML file of the present embodiment, in the process of performing color conversion of a specified image using specified characteristics and displaying the converted image, a browser is not instructed to perform data operation pixel by pixel from a HTML file but is instead instructed to overwrite the entire area of a bitmap image as original image data and data derived therefrom is expanded onto a canvas uniformly with color of an appropriate brightness value and transparency. Therefore, according to the present embodiment, compared with the method of instructing a browser to perform data manipulation pixel by pixel from the HTML file, processing speed is substantially increased and processing time required for reading of the HTML file by the browser and displaying the color-converted image is drastically reduced.

Moreover, in case any two of a R multiplication value, a G multiplication value, and a B multiplication value, or all of the values are equal to each other, color separation of the original image data into three primary colors may not be required upon multiplication processing. Similarly, some or all of the color separation processing into three primary colors may not be required for the follow-on addition/subtraction processing. In the above case, the color separation into three primary colors may be omitted. Further, depending on the particular color conversion characteristics, the value by which the brightness value of each color of the original image is multiplied may sometimes be 0 or 1. Similarly, the value to be added to or subtracted from a multiplication result for each color of the original image may sometimes be 0, a positive maximum brightness value, or a negative maximum brightness value.

Description has been heretofore given of this embodiment. However, the above embodiment is presented only to facilitate understanding of the present invention, and thus not to provide limited interpretation of the present invention. The present invention can be modified or improved without departing from the gist thereof, and equivalents of the present invention are also included in the present invention.

What is claimed is:

1. A non-transitory computer-readable storage medium containing a computer software program, wherein the program comprises instructions that when executed cause a computer to perform the following steps:
   creating three sets of identical original image data, wherein each set of original image data is expanded into a bitmap image;
   overwriting, in a darker synthesis mode, the original image data uniformly with high brightness R primary color data, the original image data uniformly with high brightness G primary color data, and the original image data uniformly with high brightness B primary color data;
   creating R original image data, G original image data, and B original image data obtained by color separation of the original image data into three primary colors R, G, and B;
   defining a brightness value and a transparency value for attenuating an R component, a brightness value and a transparency value for attenuating a G component, and a brightness value and a transparency value for attenuating a B component, wherein each of the brightness values and the transparency values correspond to a ratio of attenuating each of the brightness values of RGB components of the original image data;
   creating, in a standard drawing mode, a darkened R image data by overwriting the R original image data uniformly with black data of the brightness value and the transparency value for attenuating the R component, a darkened G image data by overwriting the G original image data uniformly with black data of the brightness value and the transparency value for attenuating the G component, and a darkened B image data by overwriting the B original image data uniformly with black data of the brightness value and the transparency value for attenuating the B component;
   defining R primary color data with a brightness value and a transparency value for addition to and subtraction from the R component, G primary color data with a brightness value and a transparency value for addition to and subtraction from the G component, and B primary color data with a brightness value and a transparency value for addition to and subtraction from the B component, wherein each primary color data correspond to a value added to or subtracted from each of the brightness values of the respective RGB components of the original image data;
   creating, in a lighter synthesis mode for addition and in a darker synthesis mode for subtraction, a dark-shifted R image data by overwriting the darkened R original image data uniformly with R primary color data with the brightness value and the transparency value for addition and subtraction of the R component, a dark-shifted G image data by overwriting the darkened G original image data uniformly with G primary color data with the brightness value and the transparency value for addition and subtraction of the G component, and a dark-shifted B image data by overwriting the darkened B original image data uniformly with B primary color data with the brightness value and the transparency value for addition and subtraction of the B component;
   synthesizing the dark-shifted R image data, the dark-shifted G image data, and the dark-shifted B image data; and
   displaying a color-converted image based on the synthesized image data.

2. The non-transitory computer-readable storage medium containing a computer software program according to claim 1, wherein the instructions further cause the computer to perform the steps of:
   extracting information specifying image data in a SWF file and extracting {RedMultTerm, GreenMultTerm, BlueMultTerm} and {RedAddTerm, GreenAddTerm, BlueAddTerm} for modifying the image data;
   defining the image data specified by the extracted information as the original image data;
   creating the brightness value and the transparency value for attenuating the R component, the brightness value and the transparency value for attenuating the R component, and the brightness value and the transparency value for attenuating the B component according to the extracted {RedMultTerm, GreenMultTerm, BlueMultTerm};
   wherein, if the extracted RedAddTerm is larger than 0, creating the brightness value and the transparency value for addition of the R component corresponding to the RedAddTerm, and, if the RedAddTerm is smaller than 0, creating the brightness value and the transparency value for subtraction of the R component corresponding to the RedAddTerm;
   wherein, if the extracted GreenAddTerm is larger than 0, creating the brightness value and the transparency value for addition of the G component corresponding to the GreenAddTerm, and, if the GreenAddTerm is smaller than 0, creating the brightness value and the transparency value for subtraction of the G component corresponding to the GreenAddTerm; and
   wherein, if the extracted BlueAddTerm is larger than 0, creating the brightness value and the transparency value for addition of the B component corresponding to the BlueAddTerm, and, if the BlueAddTerm is smaller than 0, creating the brightness value and the transparency value for subtraction of the B component corresponding to the BlueAddTerm.

3. The non-transitory computer-readable storage medium according to claim 1, wherein the computer software program comprising instructions is a HTML file configured to cause a browser to perform color conversion of a specified image according to specified characteristics and display the color-converted specified image, wherein the browser is adapted to a HTML in which canvas elements are usable.

* * * * *